(12) United States Patent
Wellman

(10) Patent No.: US 8,567,876 B2
(45) Date of Patent: Oct. 29, 2013

(54) VEHICLE TRACK

(75) Inventor: Ronald Alan Wellman, Coldwater, OH (US)

(73) Assignee: Veyance Technologies, Inc., Fairlawn, OH (US)

( * ) Notice: Subject to any disclaimer, the term of this patent is extended or adjusted under 35 U.S.C. 154(b) by 476 days.

(21) Appl. No.: 12/944,398

(22) Filed: Nov. 11, 2010

(65) Prior Publication Data

US 2011/0121644 A1 May 26, 2011

Related U.S. Application Data

(60) Provisional application No. 61/264,535, filed on Nov. 25, 2009.

(51) Int. Cl.
*B62D 55/24* (2006.01)

(52) U.S. Cl.
USPC .......................................... 305/166; 305/174

(58) Field of Classification Search
USPC ......... 305/157, 165, 166, 170, 173, 174, 179, 305/185
See application file for complete search history.

(56) References Cited

U.S. PATENT DOCUMENTS

| | | | | |
|---|---|---|---|---|
| 1,400,100 A * | 12/1921 | Reddaway | ..................... | 305/184 |
| 2,476,460 A * | 7/1949 | Smith | ........................... | 305/112 |
| 3,118,709 A * | 1/1964 | Case | ............................. | 305/170 |
| 6,609,770 B2 * | 8/2003 | Gauthier | ....................... | 305/167 |
| 6,932,442 B2 * | 8/2005 | Hori | ............................... | 305/171 |
| 6,974,196 B2 | 12/2005 | Gagne et al. | .................. | 306/166 |
| 7,784,884 B2 * | 8/2010 | Soucy et al. | .................. | 305/175 |
| 7,914,090 B2 * | 3/2011 | Soucy et al. | .................. | 305/174 |
| 2004/0222697 A1 * | 11/2004 | Soucy et al. | .................. | 305/165 |
| 2007/0126286 A1 * | 6/2007 | Feldmann et al. | ............ | 305/165 |
| 2008/0100134 A1 * | 5/2008 | Soucy et al. | .................. | 305/179 |
| 2008/0136255 A1 | 6/2008 | Feldmann et al. | ............ | 305/167 |

FOREIGN PATENT DOCUMENTS

| | | |
|---|---|---|
| CA | 2 412 182 A1 | 5/2004 |
| EP | 1176087 A1 | 1/2002 |
| WO | WO 91/07306 A1 | 5/1991 |
| WO | WO 2004/083024 A1 | 9/2004 |

* cited by examiner

*Primary Examiner* — Kip T Kotter
(74) *Attorney, Agent, or Firm* — Alvin T. Rockhill; Kathleen K. Bowen

(57) ABSTRACT

The tracks of the present invention utilize cut pieces of reinforcement which are associated with each individual drive lug. By using individual pieces the lugs can be easily built up with multiple layers of rubber and reinforcement. The cut pieces can be strategically shaped and placed to optimize their effect to realize improved performance and durability of the track. Incorporation of such inner fabric reinforcement layers adds stiffness to the lugs and thereby increases the torque capacity of the track. Additional layers also provide increased damage resistance after the outer layers of fabric are worn away, and added layers improve wear resistance on the sides of the lugs due to undercarriage misalignment and track-to-wheel contact when the vehicle turns during normal operations.

19 Claims, 4 Drawing Sheets

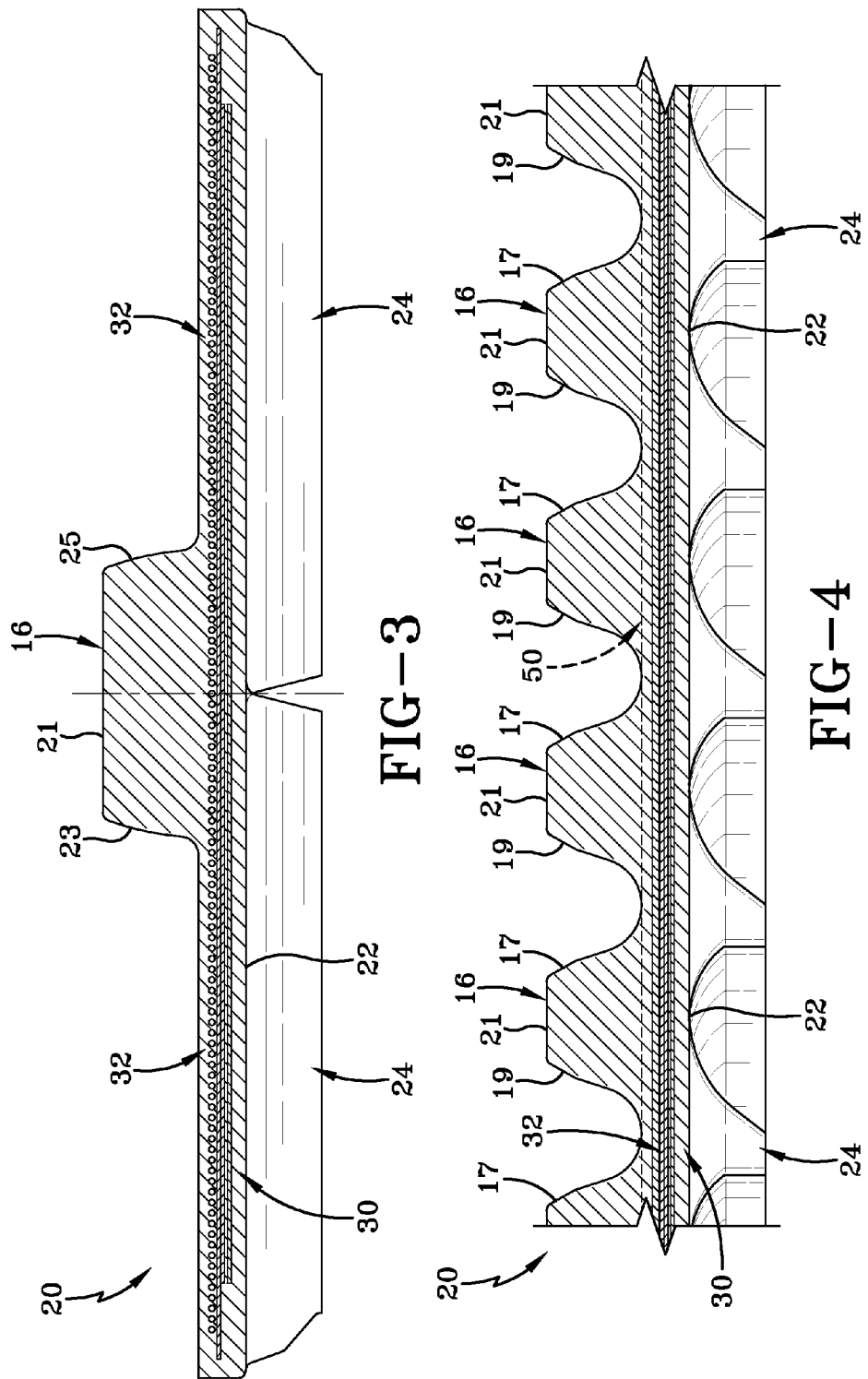

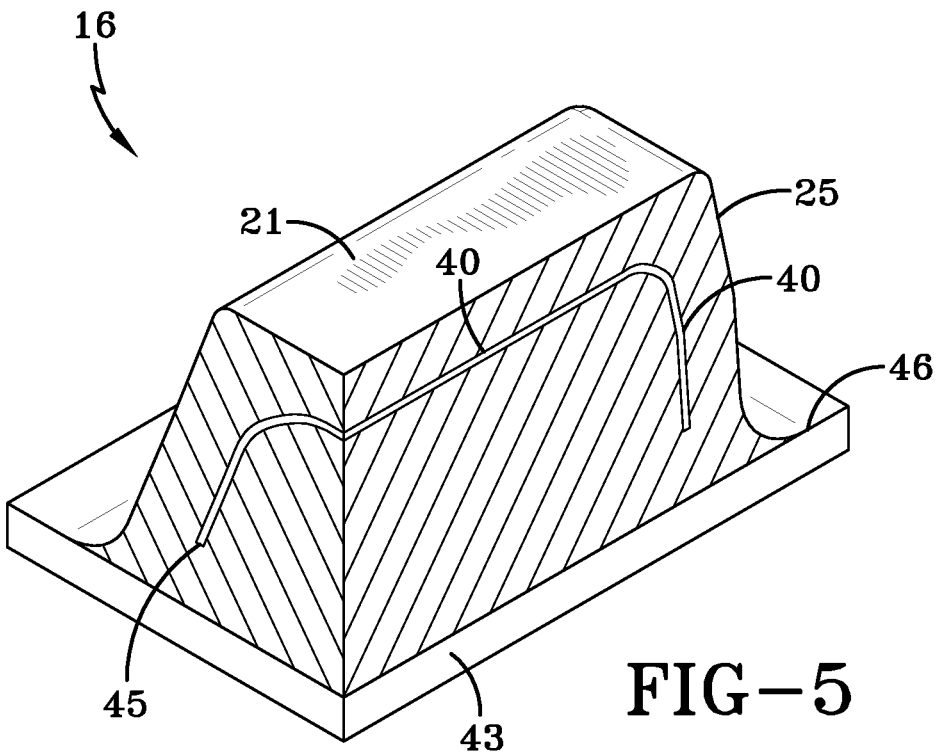
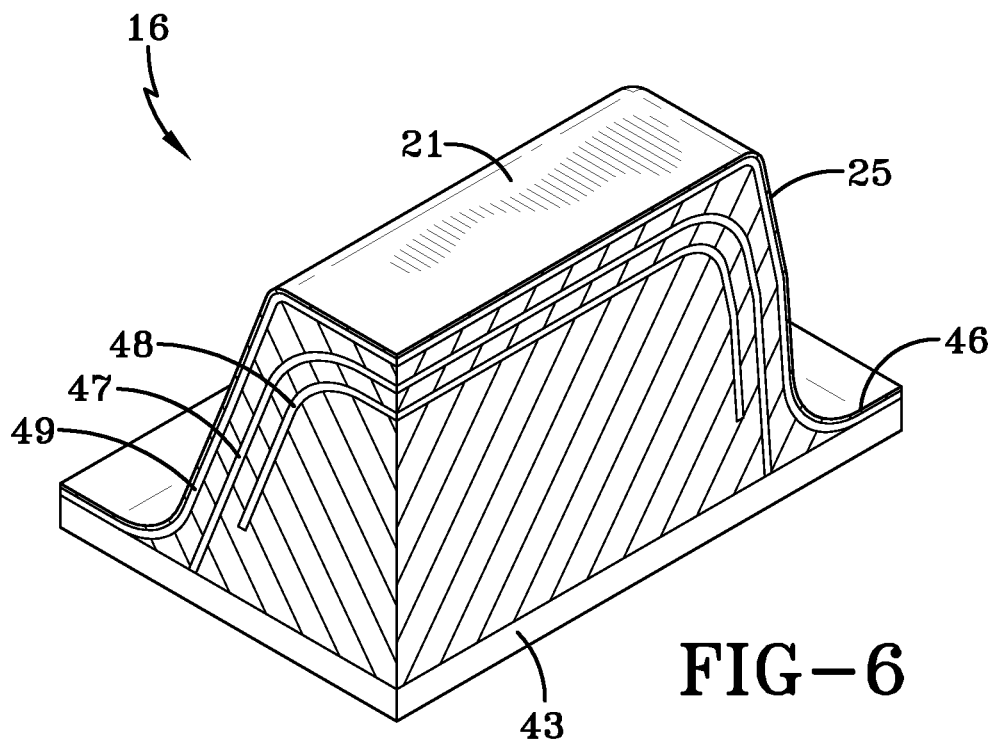

VEHICLE TRACK

This application claims benefit of U.S. Provisional Patent Application Ser. No. 61/264,535, filed on Nov. 25, 2009. The teachings of U.S. Provisional Patent Application Ser. No. 61/264,535 are incorporated herein by reference in their entirety.

BACKGROUND OF THE INVENTION

Positive drive, endless rubber tracks such as those used on agricultural or industrial vehicles typically have an internal, center row of individual drive lugs which engage drive bars on a drive wheel. The continued use and contact between the drive bar and drive lugs cause internal lug stresses and surface wear at the points of contact. Additionally, the internal, center row of lugs are typically functioning not only to transmit power from the drive wheel to the track, but also to retain the track on the vehicle. Contact between the vehicle undercarriage wheels and lateral end of the guide surfaces of the inner lugs frequently occurs as the vehicle maneuvers during normal service. This contact can cause wearing of the inner lugs, which can be severe, depending upon various vehicle design features and application use. Driving and/or guiding forces on the inner lugs, henceforth referred to as guide-drive lugs, can lead to cracks and eventual chunking of the rubber surface, and possibly to complete removal of the drive lugs, making the track unserviceable. Thus, a track belt having guide-drive lugs which are stronger and more resistant to wear is desired.

United States Patent Publication No. 2008/0136255 A1 discloses an endless track belt for use in an industrial or agricultural vehicle. The endless rubber track belts described therein include a rubber carcass having an inner surface having one or more drive lugs and an outer surface having tread lugs. The drive lugs include reinforcement layers that partially or substantially cover all or a portion of the end faces of the drive lugs. The reinforcement layers may include continuous strips, or discrete strips. The reinforcement layer may also be fabric cutouts to match the shape of the drive end faces of the drive lugs.

U.S. Pat. No. 6,974,196 B2 describes an endless track for an industrial or agricultural vehicle consisting of a body formed of a rubber material having an outer surface displaying a series of ground engaging profiles longitudinally spaced along the surface and an inner surface displaying a series of longitudinally spaced drive lugs adapted to be engaged by drive sprockets on the vehicle driving assembly. The body of the endless track is fabric reinforced. One layer of fabric longitudinally extends at a distance from the inner surface of the track and has a width slightly less than the width of the drive lugs so that the fabric may extend inside the drive lugs to increase their rigidity.

SUMMARY OF THE INVENTION

The tracks of the present invention utilize cut pieces of reinforcement which are associated with each individual drive lug. By using individual pieces the lugs can be easily built-up with multiple layers of rubber and reinforcement. The cut pieces can be strategically shaped and placed to optimize their effect to attain improved performance and durability of the track, including higher tractive effort loads.

Incorporation of such fabric reinforcement layers adds stiffness to the lugs and thereby increases the torque capacity of the track. Additional layers also provide increased damage resistance after the outer layers of fabric are worn away, and added layers improve wear resistance on the sides of the lugs due to undercarriage misalignment and track-to-wheel contact which is encountered when the vehicle is turned during normal operations.

All embedded inner fabric reinforcement layers are made of individually cut pieces of fabric which do not extend continuously around the entire circumference of the track. The finite length of embedded inner fabric reinforcement is as wide as or narrower than the width of the lug. In the circumferential direction the inner fabric reinforcement layers typically both begin and end within the lug without extending into the carcass of the track. In other words, the inner fabric reinforcements do not extend through the base of the lugs. In many cases the inner fabric reinforcement layers extend into the lugs from a point that is near the base of the lugs but do not normally extend into the carcass of the track.

In one embodiment of this invention the lugs also include an outer fabric reinforcement layer which can be as wide, wider, or narrower than the width of the lugs. This outer fabric reinforcement layer longitudinally can extend from lug to lug in a continuous manner or can be non-continuous layer which extends partially of totally through the lugs. In cases where the outer fabric reinforcement is a discontinuous layer the individual pieces can overlap each other from lug to lug.

The present invention more specifically discloses an endless vehicle track comprising a body formed of an elastomeric material having an outer surface displaying a series of ground engaging profiles longitudinally spaced along said surface and an inner surface displaying a series of longitudinally spaced guide-drive lugs for retaining said track on said vehicle and/or driving said vehicle, said guide-drive lugs having a given width and height, said guide-drive lugs having embedded therein at least a first inner fabric reinforcement layer extending into the guide-drive lugs to a distance inward from the outer surface, wherein the inner fabric reinforcement layer begins at a first point within the guide-drive lugs and ends at a second point within the guide-drive lugs.

BRIEF DESCRIPTION OF THE DRAWINGS

FIG. 3 is a cross-sectional view of the endless rubber track of FIG. 2, taken generally along line 3-3 in FIG. 2.

FIG. 4 is a cross-sectional view of the endless rubber track of FIG. 2, taken generally along line 4-4 in FIG. 2.

FIG. 5 is a cross-sectional view of a drive lug showing a layer of fabric longitudinally extending into the lugs to a distance inward from the outer surface, wherein the fabric reinforcements begin at a first point within the lugs and end at a second point within the lugs without extending into the carcass of the track.

FIG. 6 is a cross-sectional view of a drive lug showing multiple layers of fabric longitudinally extending into the lugs to a distance inward from the outer surface, wherein the fabric reinforcements begin at a first point within the lugs and end at a second point within the lugs without extending into the carcass of the track.

DETAILED DESCRIPTION OF THE INVENTION

Figure 1:
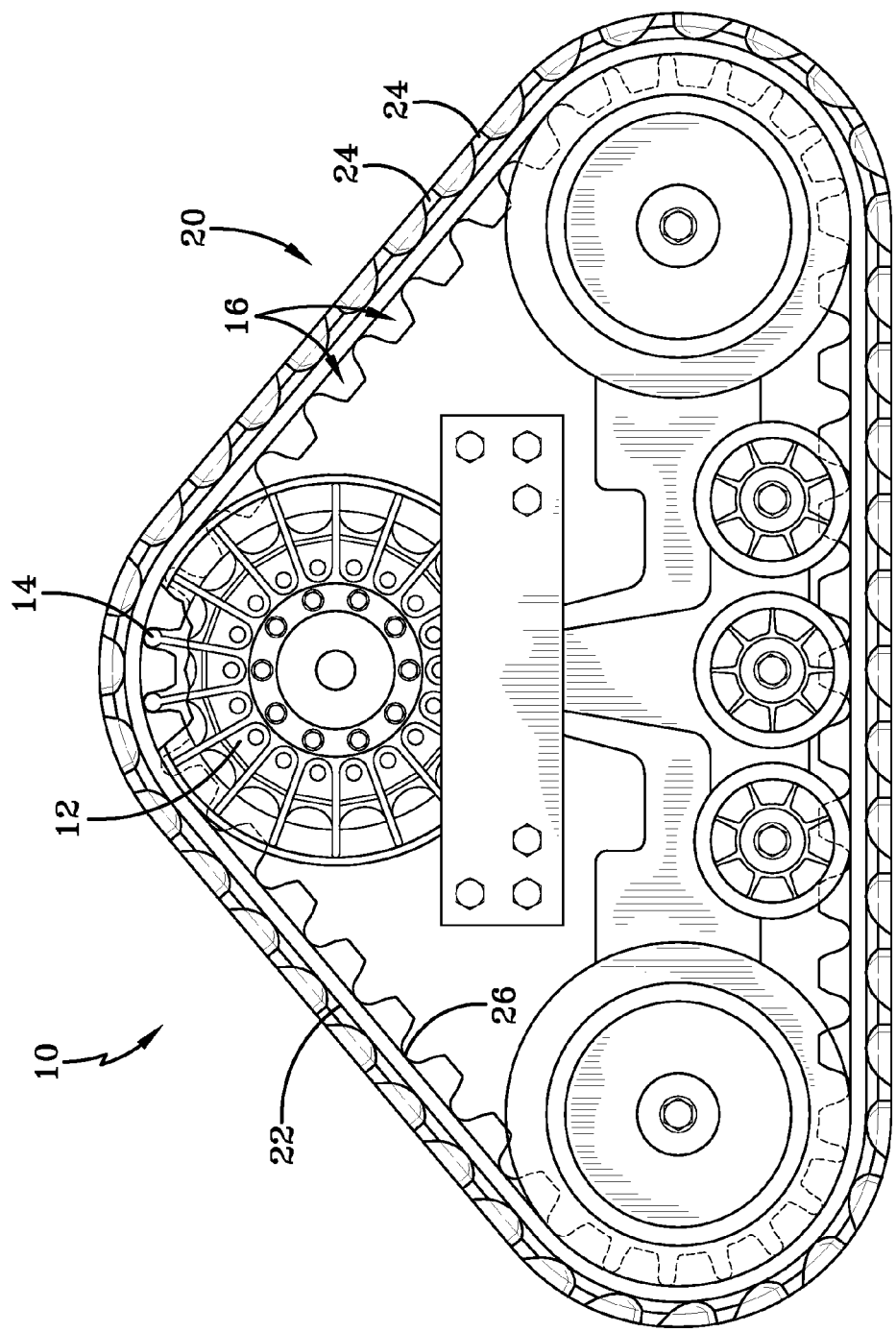
FIG. 1 is an elevation view of an exemplary endless rubber track assembly.

FIG. 1 illustrates a track assembly 10 which may be used on an industrial or agricultural vehicle (not shown). The track assembly 10 includes a drive wheel 12 comprising a plurality of teeth or drive bars 14 that are positioned for mating engagement with guide-drive lugs 16. The drive lugs 16 are mounted on a rubber track 20 having an endless elongate carcass. The endless track carcass has an outer surface 22 comprising a plurality of ground engaging tread lugs 24 and an inner surface 26 with a plurality of guide-drive lugs 16, typically located on the center portion of the carcass.

Figure 2:
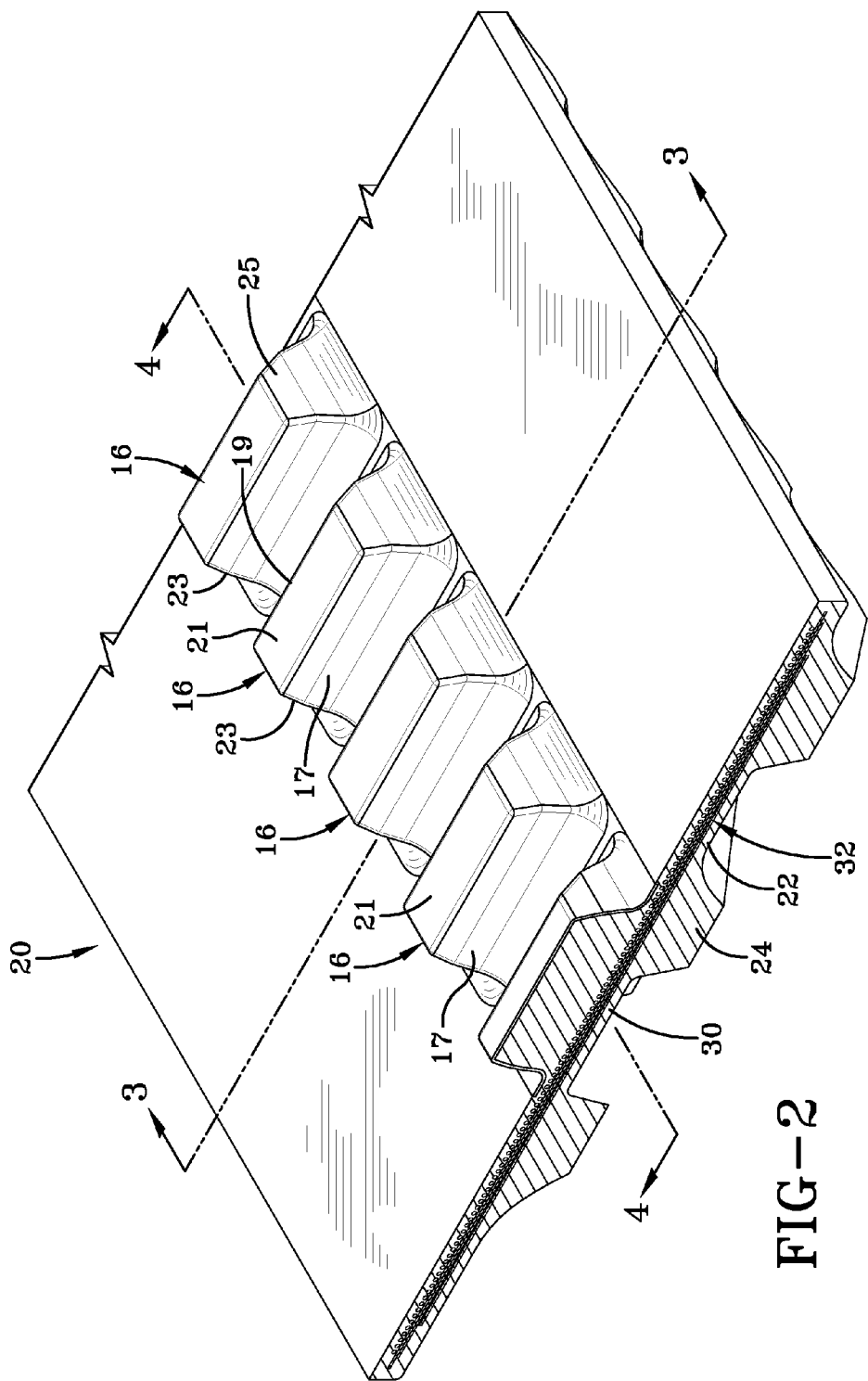
FIG. 2 is a perspective view of a section of the exemplary endless rubber track shown in FIG. 1.

FIG. 2 illustrates one embodiment of this invention wherein the guide-drive lugs both retain the track on the vehicle and are engaged by the drive wheel to transfer power to the track. In another embodiment of this invention, the guide-drive lugs are only provided for the purpose of retaining the track on the vehicle. In this scenario, the guide-drive lug only act in the capacity of guide-lugs. In cases where the lugs act to both guide and drive the track, each guide-drive lug 16 comprises an elongated shaped bar with inclined drive faces 17, 19, and an upper flat face 21. The inclined faces are typically known as the drive face 17 and the reverse face 19 of the guide-drive lugs 16. End or guiding faces 23, 25 may be flat or in the alternative they can have various other shapes.

As shown in FIG. 3 and FIG. 4, the belt carcass 20 typically comprises one or more layers of gum rubber or elastomeric material 30. Embedded within the gum rubber are one or more reinforcement layers 32 which extend transversely along the track width. The reinforcement layers 32 may comprise longitudinal cable reinforcement layers, fabric reinforcement layers, or any other reinforcement layer known to those skilled in the art. The guide-drive lugs 16, as shown in FIGS. 2-4 are comprised of natural rubber or synthetic rubber, such as emulsion styrene-butadiene rubber, solution styrene-butadiene rubber, synthetic polyisoprene rubber, polybutadiene rubber, or a blend of natural and synthetic rubbers.

FIG. 5 shows an inner fabric reinforcement layer 40 embedded within a drive lug 16 wherein the inner fabric extends into the drive lugs 16 to a distance inward from the outer surface (upper flat face 21 of the drive lugs 16), wherein the inner fabric reinforcement layer 40 begins at a first point within the lugs and end at a second point within the lugs without extending into the carcass of the track 43. As can be seen, the inner fabric reinforcement layer does not extend continuously between different lugs of the track. It should also be noted that the inner fabric reinforcement layer has a width that is narrower than or equal to the width of the drive lugs. In one embodiment of this invention the inner fabric reinforcement layer 40 extends into the lugs 16 from a point at or close to the base 46 of the lugs (as shown in FIG. 5) where the lugs are affixed to the carcass of the track 43. In one embodiment of this invention the inner fabric reinforcement layer extends into the lugs from a point 45 that is at least 0.125 inch from the base 46 of the lugs 16. The base of the lugs is also shown as line 50 in FIG. 4. It is typical for the inner fabric reinforcement layer 40 to extend into the lugs 16 from a point 45 that is at least 0.25 inch from the base 46 of the lugs 16. The inner fabric reinforcement layer 40 will typically also be embedded within the lugs 16 at a distance of at least 0.125 inch from the upper surface 21 (outer surface) of the lugs. In many cases the inner fabric reinforcement layer 40 will be embedded within the lugs 16 at a distance of at least 0.25 inch from the upper surface 21 (outer surface) of the lugs. In most cases the inner fabric reinforcement 40 will be embedded totally within the lugs without extending beyond the base 46 of the lugs 16 and certainly without extending into the carcass 43 of the track.

FIG. 6 illustrates another embodiment of this invention wherein multiple layers of inner fabric reinforcement 47, 48 are included within each drive lug 16 and extending into the drive lugs to a distance inward from the outer surface (upper flat face 21 of the drive lugs 16), wherein the fabric reinforcements begin at a first point within the lugs and end at a second point within the lugs without extending into the carcass of the track 43. In the embodiment of the invention illustrated in FIG. 6 an outer (external) fabric reinforcement layer 49 is built onto the outer surface of the drive lugs 16. In this embodiment of the invention both the first fabric reinforcement layer 47 and the second fabric reinforcement layer are embedded within the lugs 16 without extending into the carcass of the track. The second inner fabric reinforcement layer 48 will typically embedded at least 0.125 inch deeper into the drive lugs 16 from the upper face 21 of the drive lugs than the first inner fabric layer 47. In most cases, the second inner fabric reinforcement layer 48 will be embedded at least 0.25 inch deeper into the drive lugs 16 from the upper face 21 of the drive lugs than the first inner fabric layer 47. Additional, inner fabric reinforcement layers will normally be embedded into the lugs at a distance of at least 0.125 inches and preferably at least 0.25 inches apart (deeper into the lug that the next inner fabric reinforcement layer). The tracks of this invention can optionally contain 3, 4 or even more layers of fabric reinforcement.

While certain representative embodiments and details have been shown for the purpose of illustrating the subject invention, it will be apparent to those skilled in this art that various changes and modifications can be made therein without departing from the scope of the subject invention.

What is claimed is:

1. An endless vehicle track which may be used on a vehicle, said endless vehicle track comprising a body formed of an elastomeric material having an outer surface displaying a series of ground engaging profiles longitudinally spaced along said surface and an inner surface displaying a series of longitudinally spaced guide-drive lugs for retaining said track on said vehicle and/or driving said vehicle, said guide-drive lugs having a base and an outer surface on an upper face thereof, said guide-drive lugs having a given width and height, said guide-drive lugs having embedded therein at least a first inner fabric reinforcement layer extending into the guide-drive lugs to a distance inward from the outer surface, wherein the inner fabric reinforcement layer begins at a first point within a respective guide-drive lug of the series of guide-drive lugs and ends at a second point within the respective guide-drive lug of the series of guide-drive lugs.

2. The endless vehicle track of claim 1 wherein the inner fabric reinforcement layer does not extend continuously and longitudinally between different lugs on the track.

3. The endless vehicle track of claim 1 wherein the inner fabric reinforcement layer has a transverse width that is narrower than or equal to the width of the guide-drive lugs.

4. The endless vehicle track of claim 1 wherein the inner fabric reinforcement layer extends into the lugs from essentially the base of the lugs.

5. The endless vehicle track of claim 1 wherein the inner fabric reinforcement layer extends into the lugs from the first point that is at least 0.125 inch from the base of the lugs.

6. The endless vehicle track of claim 5 wherein the inner fabric reinforcement layer is embedded within the lugs at a minimum distance of 0.125 inch from the outer surface of the upper face of the guide-drive lugs.

7. The endless vehicle track of claim 1 wherein the inner fabric reinforcement layer extends into the lugs from the first point that is at least 0.25 inch from the base of the lugs, and wherein the inner fabric reinforcement layer is embedded within the lugs at a minimum distance of 0.25 inch from the outer surface of the upper face of the guide-drive lugs.

8. The endless vehicle track of claim 1 which is further comprised of an outer fabric reinforcement layer that extends over the lugs at or near the surface of at least one drive face of said lugs.

9. The endless vehicle track of claim 8 wherein the outer fabric reinforcement layer extends over the lugs at or near the surface of at least one drive face of said lugs and further extends over the lugs at or near the surface of at least a portion of the upper face of said lugs.

10. The endless vehicle track of claim 8 wherein the drive lugs have a reverse face, and wherein the outer fabric reinforcement layer extends over the lugs at or near the surface of the guide-drive lugs and further extends at or near the surface of at least a portion of the drive face and the reverse face of the guide-drive lugs.

11. The endless vehicle track of claim 8 wherein the outer fabric reinforcement layer extends at or near substantially the entire surface of the lugs.

12. The endless vehicle track of claim 8 wherein the outer fabric reinforcement layer longitudinally extends continuously from lug to lug.

13. The endless vehicle track of claim 1 which is further comprised of a second inner fabric reinforcement layer which is embedded in the guide-drive lugs.

14. The endless vehicle track of claim 13 wherein the second inner fabric reinforcement layer is embedded at least 0.125 inch deeper into the guide-drive lugs from the upper face of the guide-drive lugs than the first inner fabric reinforcement layer.

15. The endless vehicle track of claim 13 wherein the second inner fabric reinforcement layer is embedded at least 0.25 inch deeper into the guide-drive lugs from the upper face of the guide-drive lugs than the first inner fabric reinforcement layer.

16. The endless vehicle track of claim 1 which is further comprised of an outer fabric reinforcement layer that extends over the lugs at the surface of at least one drive face of said lugs.

17. The endless vehicle track of claim 16 wherein the outer fabric reinforcement layer extends over the lugs at the surface of at least one drive face of said lugs and further extends over the lugs at or near the surface of at least a portion of the upper face of said lugs.

18. The endless vehicle track of claim 16 wherein the guide-drive lugs have a reverse face, and wherein the outer fabric reinforcement layer extends over the lugs at or near the surface of the guide-drive lugs and further extends at the surface of at least a portion of the drive face and the reverse face of the guide-drive lugs.

19. The endless vehicle track of claim 16 wherein the outer fabric reinforcement layer extends over substantially the entire surface of the lugs.

* * * * *